United States Patent
Malik et al.

(10) Patent No.: US 7,139,878 B2
(45) Date of Patent: Nov. 21, 2006

(54) METHOD AND APPARATUS FOR DYNAMIC PREFETCH BUFFER CONFIGURATION AND REPLACEMENT

(75) Inventors: Afzal M. Malik, Austin, TX (US); William C. Moyer, Dripping Springs, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 560 days.

(21) Appl. No.: 10/600,959

(22) Filed: Jun. 20, 2003

(65) Prior Publication Data

US 2004/0260908 A1 Dec. 23, 2004

(51) Int. Cl.
G06F 12/00 (2006.01)
(52) U.S. Cl. ............ 711/137; 711/133; 711/144; 711/170
(58) Field of Classification Search ........... 709/104; 710/35, 52, 56, 310; 711/133, 137, 140, 711/146; 712/156, 170, 237
See application file for complete search history.

(56) References Cited

U.S. PATENT DOCUMENTS

| | | | |
|---|---|---|---|
| 5,958,040 A | | 9/1999 | Jouppi |
| 6,085,291 A | * | 7/2000 | Hicks et al. ............ 711/137 |
| 6,529,998 B1 | | 3/2003 | Yochai et al. |
| 6,636,927 B1 | * | 10/2003 | Peters et al. ............ 710/309 |
| 6,718,452 B1 | * | 4/2004 | Wojcieszak et al. ..... 711/171 |
| 2004/0068615 A1 | * | 4/2004 | Chaudhari et al. ...... 711/137 |

* cited by examiner

*Primary Examiner*—Reginald Bragdon
(74) *Attorney, Agent, or Firm*—Robert L. King; Joanna G. Chiu (57) ABSTRACT

A memory controller and method thereof configures a prefetch buffer dynamically for interfacing between multiple bus masters of different burst support and multiple memories having different characteristics. A line size of at least a portion of the prefetch buffer is modified based upon the memory controller receiving a read request from one of the bus masters. An adaptive method to optimally replace prefetch buffer lines uses prioritized status field information to determine which buffer line to replace.

20 Claims, 5 Drawing Sheets

METHOD AND APPARATUS FOR DYNAMIC PREFETCH BUFFER CONFIGURATION AND REPLACEMENT

FIELD OF THE INVENTION

This invention relates generally to semiconductor storage devices, and more specifically, to memory interfaces between a processor and a memory.

BACKGROUND OF THE INVENTION

Memory controllers are used in data processing systems to interface between different types of memory and one or more data processing masters. The various types of memory include SRAM, DRAM, Flash, ROM, MRAM and others. High performance data processor systems use 'smart' memory controllers that reduce read and write memory latency, thereby helping the data processor to continue execution of the instruction stream. A memory controller does not conventionally utilize a prefetch buffer for fetching required data in advance of when the data is needed by the processor. A 'smart' memory controller however incorporates a prefetch buffer for the purpose of obtaining data in advance of when the data is requested by the data processor. The prefetching unit of a smart memory controller includes Tag, Data and Status storage locations that are used to identify and supply the data to the data processor.

A method in U.S. Pat. No. 6,529,998 entitled "Adaptive Prefetching Of Data From A Disk" has been proposed for adaptively selecting an optimal prefetch policy for prefetching data from a disk storage. A policy is used that is based on a past history of read and write misses. A threshold value is used along with a random number to determine the prefetch policy. The threshold value is defined and updated based upon the number of avoidable read misses that occur during operation. The system predetermines a static fixed size buffer and is therefore limited for use in systems having multiple bus masters and various memories.

A method in U.S. Pat. No. 5,958,040 entitled "Adaptive Stream Buffers" uses instruction-specific prefetching avoidance. A table stores address information on which cache lines are not used each time a CPU executes an instruction. Subsequent instruction addresses are compared to the addresses in the table, and a buffer is not allocated when a subsequent address is found within the table. This system is limited to operation on an instruction stream (instruction read operations) and does not respond to data read accesses. Therefore data read accesses are not optimized for performance, and the disclosed system is limited to a fixed size buffer.

BRIEF DESCRIPTION OF THE DRAWINGS

The present invention is illustrated by way of example and not limitation in the accompanying figures, in which like references indicate similar elements.

Skilled artisans appreciate that elements in the figures are illustrated for simplicity and clarity and have not necessarily been drawn to scale. For example, the dimensions of some of the elements in the figures may be exaggerated relative to other elements to help improve the understanding of the embodiments of the present invention.

DETAILED DESCRIPTION OF THE DRAWINGS

Figure 1:
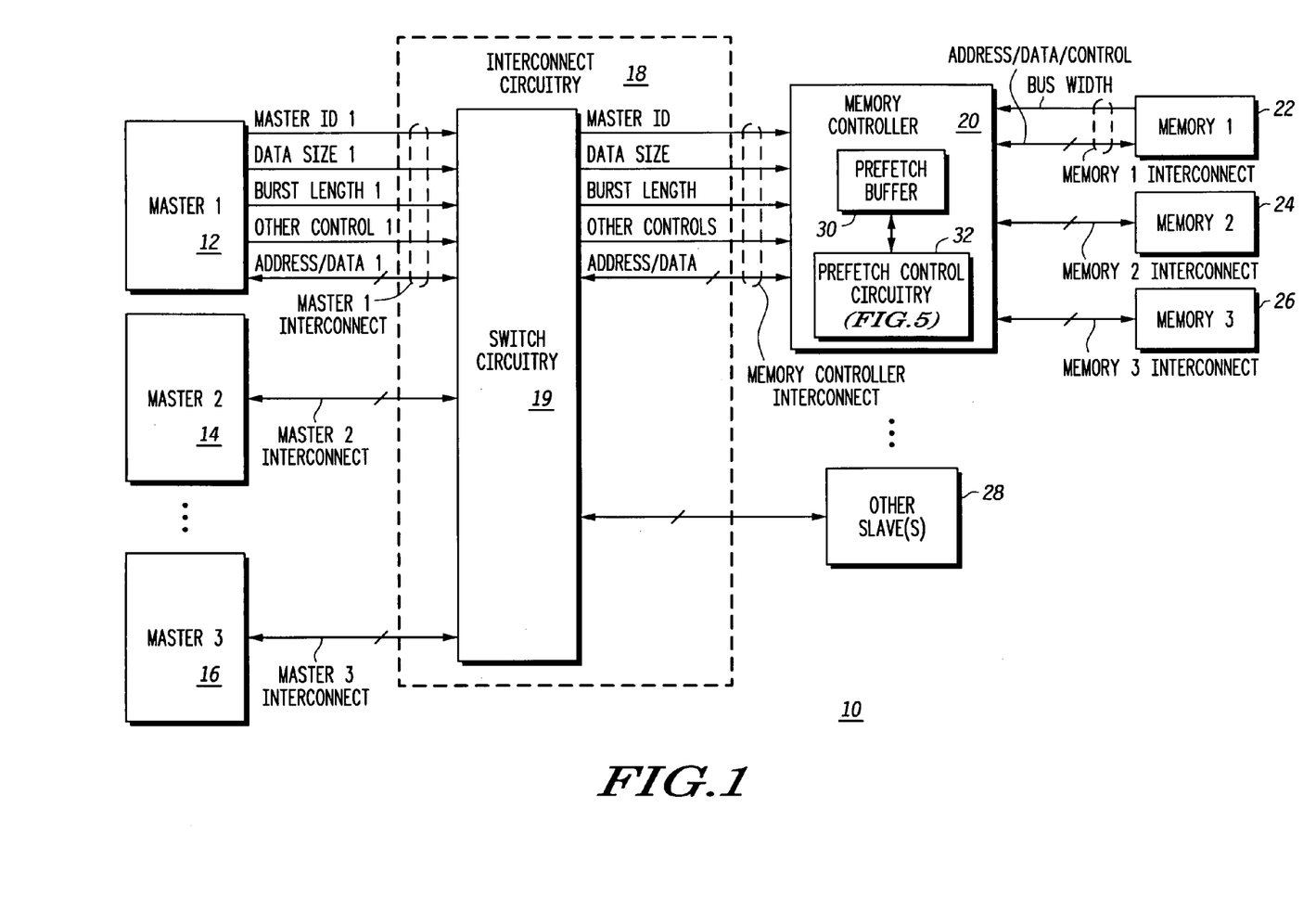
FIG. 1 illustrates in block diagram form a data processing system having a memory controller with a prefetch buffer in accordance with the present invention.

FIG. 1 illustrates in block diagram form a data processing system 10 generally having a plurality of data processors that function as a bus master of the data processing system 10. A first master 12, a second master 14 and a third master 16 are each connected to interconnect circuitry 18 that contains switch circuitry 19. Master 12, master 14 and master 16 function as bus masters and selectively have sole control of the bus formed by the memory controller interconnect between switch circuitry 19 and memory controller 20. In one form, the switch circuitry 19 is implemented as a crossbar switch. The crossbar switch conventionally contains an address decoder and a mechanism for bus arbitration to grant any one of masters 12, 14 and 16 access to a memory controller 20. Data processing system 10 further contains a first memory 22, a second memory 24 and a third memory 26, each of which is connected to the memory controller 20. Data processing system 10 also contains one or more additional slave devices 28. Examples of the other slave device(s) 28 include a timer, an LCD controller, etc. Memory controller 20 contains a prefetch buffer 30 and prefetch control circuitry 32. The first master 12 has various signaling or interconnect provided between switch circuitry 19. A master identifier or master identification (ID) signal is connected from the first master 12 to switch circuitry 19. A data size 1 signal is connected from the first bus master 12 to switch circuitry 19. One or more control signals in the form of other control 1 signal(s) are connected from the first bus master 12 to switch circuitry 19. A burst length 1 signal is connected from the first master 12 to switch circuitry 19. A bi-directional address/data 1 bus is connected between the first master 12 and switch circuitry 19. This interconnect collectively form a master 1 interconnect. Similar master interconnect signaling is connected between each of the masters 14 and 16 and the switch circuitry 19 and are not shown in detail simply for purposes of convenience of illustration. A memory controller interconnect is connected between the switch circuitry 19 and the memory controller 20. A Master Identification (ID) signal bus is connected from switch circuitry 19 to memory controller 20. A Data Size signal bus for providing a data size indicator is connected from switch circuitry 19 to memory controller 20. A Burst Length signal bus for providing a burst length indicator is connected from switch circuitry 19 to memory controller 20. A signal bus labeled 'Other Controls' is connected from switch circuitry 19 to memory controller 20 for providing a variety of additional control information from the selected bus master to memory controller 20. A bidirectional Address/Data bus is connected between switch circuitry 19 and memory controller 20. Between each of memory 22, 24 and 26 and memory controller 20 is a memory interconnect. For example, a first memory interconnect is connected between memory controller 20 and first memory 22. A bus width signal is connected from the first memory 22 to the memory controller 20. A multi-bit bi-directional Address/Data/Control bus is connected between first memory 22 and memory controller 20. In the illustrated form, the second memory interconnect and the third memory interconnect are the same as the first memory interconnect but are not shown in detail for convenience of illustration.

In operation, any one of the masters 12, 14 and 16 issues or generates at least one or more data requests to any of the memories 22, 24 and 26 that are addressed by a read request of the memories. In response, the interconnect circuitry 18 grants ownership of the memory controller interconnect to the requesting master. The read request from the master is seen by the memory controller 20. The read request has one or more attributes such as the Data Size and Burst Length. The memory controller is aware of the master ID, the data size being requested and a requested burst length as well as a memory address. The Burst Length signal communicates to the memory controller 20 whether the requested operation is a burst operation. Based on the information in the memory controller interconnect, if the address hits in the prefetch buffer 30 meaning that the requested data is in the prefetch buffer, the data is provided directly to the switch circuitry 19 and back to the requesting master. Status bits in the prefetch buffer 30, to be described below, are accordingly updated.

If the address does not hit in the prefetch buffer 30 and misses, based on whether the requesting master is enabled for prefetching, dynamic configuration of the prefetch buffer line size occurs based on data size and burst length. An adaptive buffer line replacement algorithm, to be described below, selects which buffer line is replaced and new data written to. The prefetch control circuitry 32 determines the number and size of the accesses to the memories 22, 24 and 26 based on buffer configuration and memory bus width. The data that is requested is then provided to the requesting master.

Figure 2:
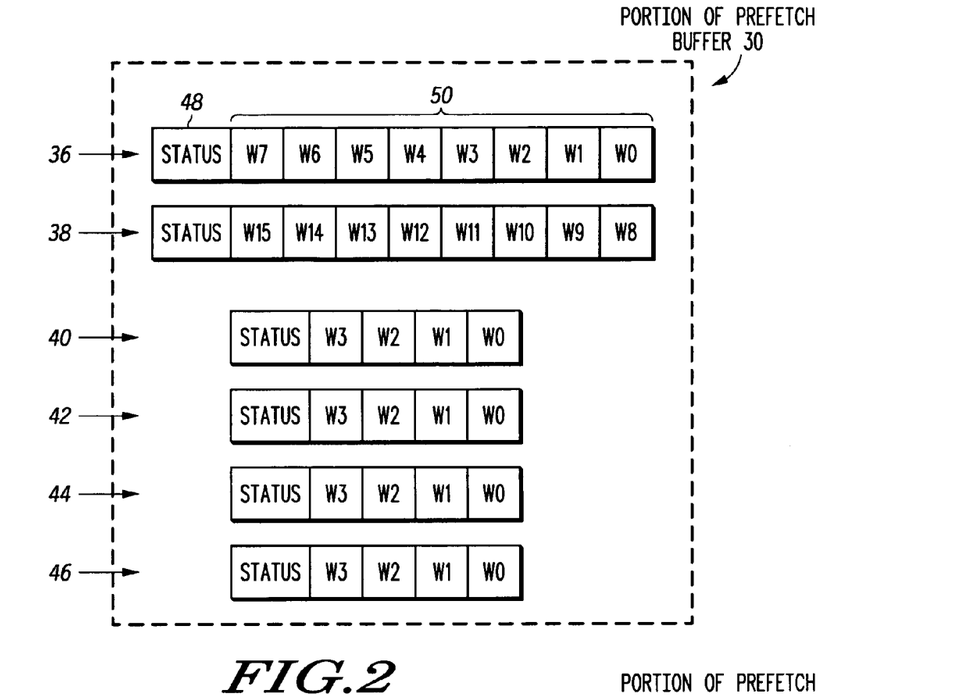
FIG. 2 illustrates in diagrammatic form a first prefetch buffer configuration in accordance with one form of the present invention.

Illustrated in FIG. 2 is a diagram of a portion of a configuration of the prefetch buffer 30 based upon different burst length support. In the illustrated form, a plurality of burst blocks or burst lines, such as burst lines 36, 38, 40, 42, 44 and 46, is provided. Burst lines 36 and 38 support eight word (i.e. thirty-two bit words) burst operation. Within each burst line, such as burst line 36 is a status field 48 and a predetermined number of data words in a data field 50. Prefetch buffer 30 is configured for eight word burst operation in each of burst lines 36 and 38, whereas prefetch buffer 30 is configured for four word burst operation in each of burst lines 40, 42, 44 and 46. Because there are two different sizes of burst lines, it is clear that the master is supporting at least two lengths of memory bursting, or conversely, that different bus masters support different burst lengths. It should be understood that the data from burst line 36 may have been retrieved from a same or a different one of the memories 22, 24 and 26 than the data from burst line 38. The same is true with respect to the source of data in all of the other illustrated burst lines. The particular configuration of prefetch buffer 30 is created by the prefetch control circuitry 32 in response to the Data Size signal and the Burst Length signal. The Data Size signal determines the size of a single unit of data within each burst line. The Burst Length signal determines the number of single units of data per burst line. In FIG. 2, the Data Size signal selects a data size being a word in length. Other data sizes such as multiple words or a byte could be indicated by the Data Size signal. The Burst Length signal allows the use of different types of bus masters to be implemented in data processing system 10. For example, if the first master 12 only supports bursts of eight words in length and the second bus master 14 supports bursts of four words in length, the prefetch buffer configuration of FIG. 2 will support both of these bus masters. In contrast, previous systems would require separate storage elements with predetermined fixed configurations to separately support the two differing bus masters. It should be noted that in the illustrated portion of prefetch buffer 30 of FIG. 2, the buffer storage area is dynamically configurable, based on the requested accesses to be serviced. Thus, although the illustrated configuration contains two burst line buffers holding eight words each and four burst line buffers holding four words each, depending on the history and type of burst requests, the buffers may be dynamically configured into any combination of lengths as access requests are received. Dynamic configuration of the buffers may be based at least in part on the Data Size and Burst Length signals.

Figure 3:
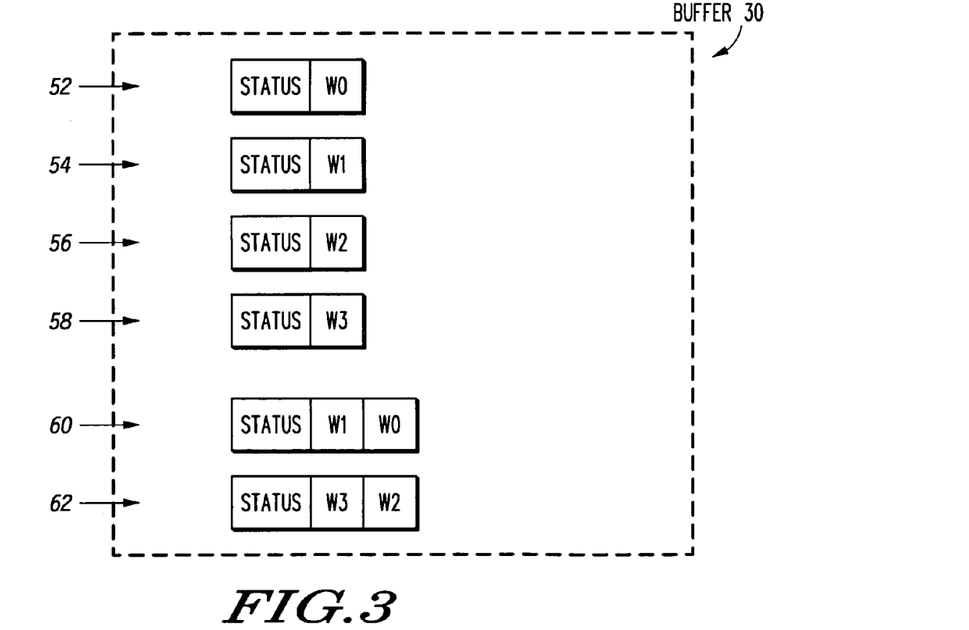
FIG. 3 illustrates in diagrammatic form a second prefetch buffer configuration in accordance with another form of the present invention.

Illustrated in FIG. 3 is an alternative configuration of a portion of prefetch buffer 30 for a non-bursting memory operation. In response to the Data Size signal and the Burst Length signal, the prefetch control circuitry adaptively configures the line size of the prefetch buffer 30. The Burst Length signal indicates that the bus master that is communicating a read request is not supporting a burst transaction for the requested data. This may be because of the type of access or any of other various reasons. The buffer lines 52, 54, 56 and 58 each have a single data word attached to a status field. In addition, buffer lines 60 and 62 have two data words attached to a status field in response to the Data Size signal indicating a data size of two words. In each of buffer lines 52, 54, 56, 58, 60 and 62 no data bursting is indicated by the Burst Length signal. Therefore, it should be noted that a variety of differing prefetch buffer configurations may be implemented in response to the prefetch control circuitry 32 receiving the Data Size signal and the Burst Length signal.

Figure 4:
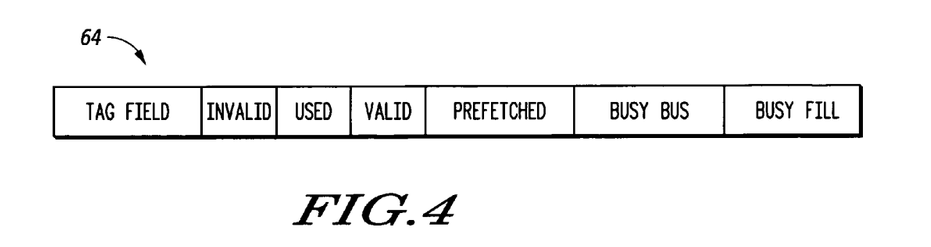
FIG. 4 illustrates in diagrammatic form a status field of a line of a prefetch buffer in accordance with the present invention.

Illustrated in FIG. 4 is an illustration of a status field 64 that represents by way of example only, any of the status fields illustrated in FIGS. 2 and 3. The status field 64 has an Address Tag Field or Tag Field, an Invalid Field or Invalid indicator, a Used Field or Used indicator, a Valid Field or Valid indicator, a Prefetched Field or Prefetched indicator, a Busy Bus Field or Busy Bus indicator and a Busy Fill Field or Busy Fill indicator. As was illustrated in FIGS. 3 and 4, the status field is associated with the smallest supported line size in the prefetch buffer 30. The Tag Field contains information that locates where in the prefetch buffer 30 a particular line of data is. The Invalid indicator denotes that the prefetch buffer 30 contains no valid data. In other words, the Invalid field indicates that a corresponding line of data in the prefetch buffer 30 is not valid. The Used indicator denotes that the prefetch buffer 30 contains valid data that has been provided to satisfy a bus burst type read. In other words, the Used field indicates that a corresponding line of data in the prefetch buffer 30 has been provided in response to a previous burst read request. The Valid indicator denotes that the prefetch buffer 30 contains valid data that has been provided to satisfy a bus single type (i.e. non-burst) read. In other words, the Valid field indicates a corresponding line in the prefetch buffer 30 has been provided in response to a previous non-burst read request. The Prefetched indicator denotes that the prefetch buffer 30 contains valid data that has been prefetched to satisfy a potential future bus access. The Busy Bus indicator denotes that the prefetch buffer 30 is currently being used to satisfy a bus burst read initiated by one of the bus masters. The Busy Fill indicator denotes that the prefetch buffer 30 has been allocated to receive data from a memory and the memory access is still in progress. The memory access may have been initiated by a preftch operation performed by prefetch control circuitry 32 and not directly associated with an access request from one of the bus masters. These indicators in status field 64 are used to determine which line or lines in prefetch buffer 30 are selected as a replacement entry. Selection of which line or lines to be chosen as a replacement entry is made in a prioritized order of the indicators of status field in the order of Invalid, Used, Valid, Prefetched, Busy Bus and Busy Fill as illustrated in FIG. 4. Note that alternate embodiments may use different indicators than those illustrated in FIG. 4 or may combine or encode indicators in an alternate manner.

Figure 5:
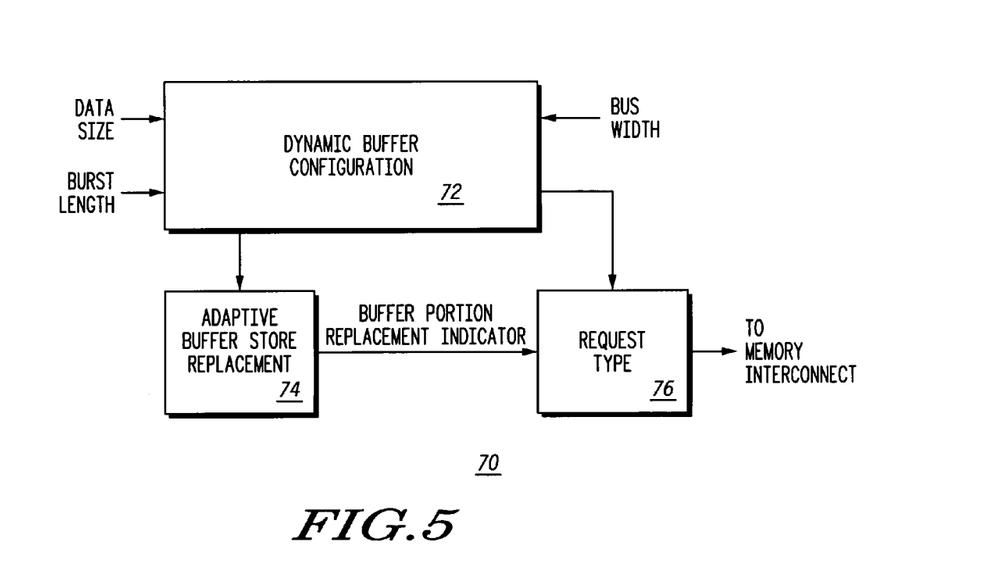
FIG. 5 illustrates in block diagram form control circuitry to provide dynamic configuration of a prefetch buffer and data replacement therein.

Illustrated in FIG. 5 is a further detail of one implementation 70 of the prefetch control circuitry 32 of FIG. 1. Dynamic Buffer Configuration logic 72 has a first input for receiving the Data Size attribute signal, a second input for receiving the Burst Length attribute signal, a third input for receiving the Bus Width signal from an addressed memory, such as memory 22, 24 or 26. A first output of the Dynamic Buffer Configuration logic 72 is connected to an input of Adaptive Buffer Store Replacement logic 74. An output of the Adaptive Buffer Store Replacement logic 74 provides a buffer portion replacement indicator and is connected to a first input of Request Type logic 76. A second output of the Dynamic Buffer Configuration logic 72 is connected to a second input of the Request Type logic 76. An output of the Request Type logic 76 is connected to one of the three Memory Interconnects of FIG. 2.

Figure 6:
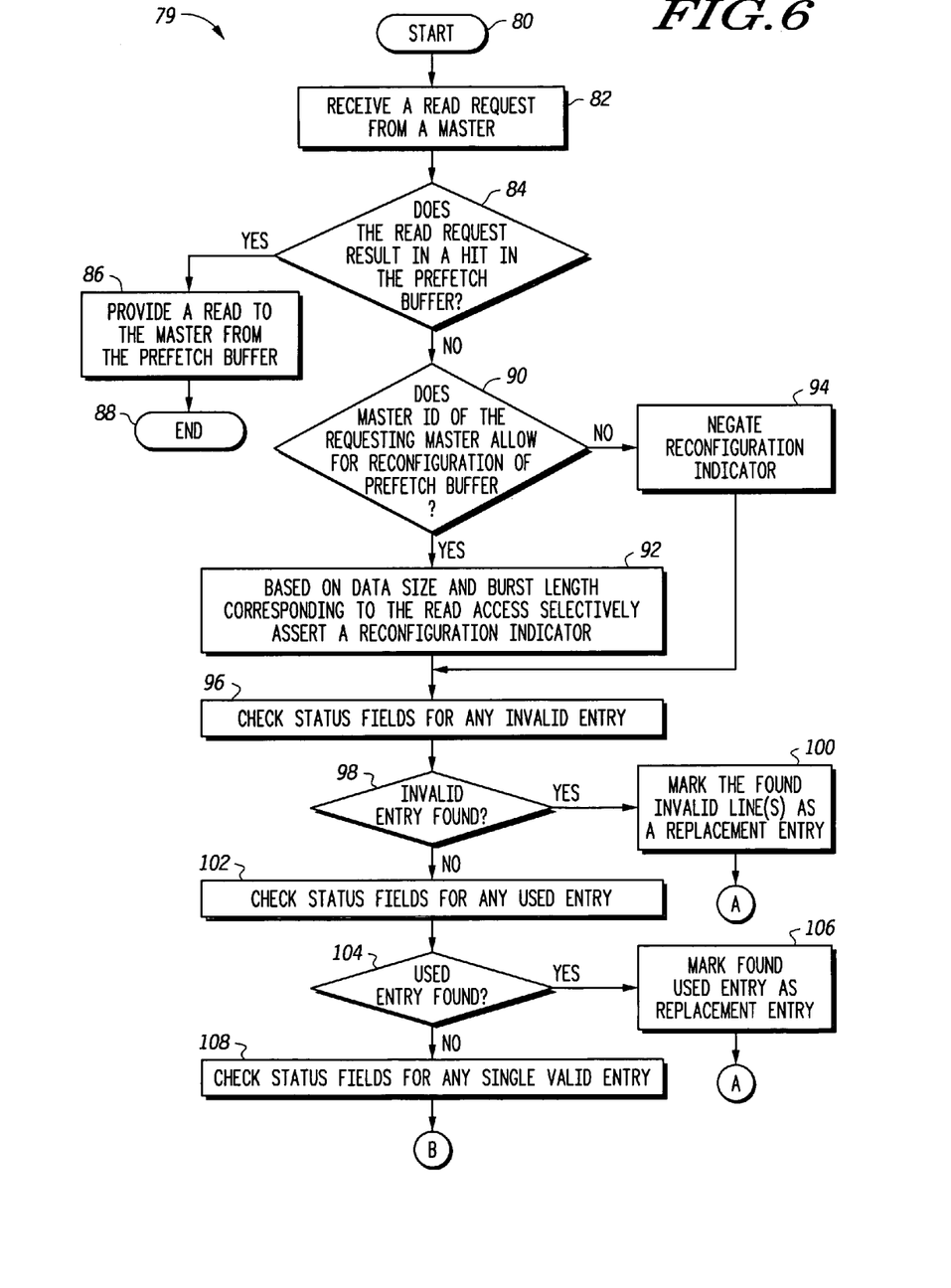
FIGS. 6–8 illustrate in flow chart form a method for adaptively configuring a prefetch buffer and replacing data in the prefetch buffer.
Figure 7:
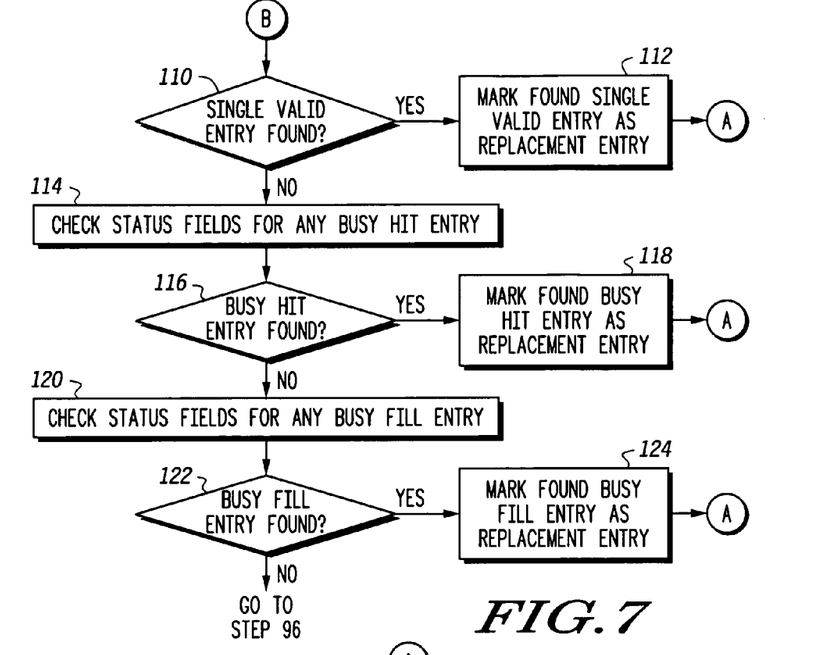
Figure 8:
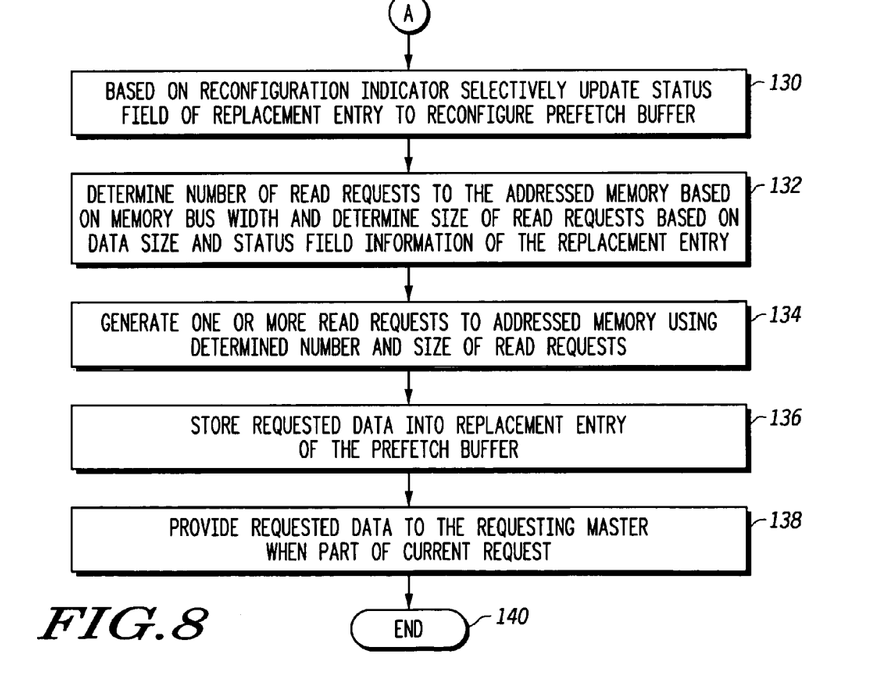

Illustrated in FIGS. 6–8 is a flowchart 79 describing the operation of data processing system 10 and in particular the implementation 70 of prefetch control circuitry 32. In a step 80, a read access in initiated. The read request is received from one of the bus masters 12, 14 or 16 in a step 82 by memory controller 20. In a step 84 a decision is made whether the read request results in a hit in the prefetch buffer 30. This decision is made as a conventional tag comparison (not shown) in the memory controller 20. If a tag match results in a hit, a step 86 is followed wherein a read to the master is made from prefetch buffer 30. An end of the read access occurs in step 88. If a miss occurs, a step 90 is implemented. A determination is made within the memory controller 20 as to whether the Master Identification (ID) signal bus of the requesting master is allowed to reconfigure the prefetch buffer 30. Logic circuitry (not shown) determines which bus masters have reconfiguration capability. Alternate embodiments may allow for reconfiguration by any bus master and thus may omit the determination step 90. If the requesting bus master can reconfigure prefetch buffer 30, then a step 92 is implemented. Based on the data size attribute and the burst length attribute corresponding to the read access, a reconfiguration indicator is selectively asserted by the Adaptive Buffer Store Replacement logic 74. The reconfiguration indicator may take one of numerous forms. For example, the reconfiguration indicator may be a signal, a machine state, a logic state, a statically driven signal, a flag indicator, an externally supplied signal at an integrated circuit pin, etc. If the requesting bus master cannot reconfigure prefetch buffer 30, then the reconfiguration indicator is negated in a step 94 by the Adaptive Buffer Store Replacement logic 74. In either event, a step 96 is implemented wherein some or all of the status fields are checked for any invalid entry in the prefetch buffer 30. It should be noted that the term 'entry' is either an entire line, a portion of a line, or more than one line. A determination is made in step 96 whether an invalid entry is found. If an invalid entry is found, the line(s) or portion of a line that was found to be invalid are marked in step 100 as a replacement entry. The portion of the line(s) that is marked depends upon the size of the entry to be replaced. One or more lines, or selection of at least a portion of a plurality of lines as a replacement entry may be performed, depending on the necessary capacity needed for the replacement data. After step 100, further steps to be described in connection with FIG. 8 are implemented.

If no invalid entry is found in step 98, the status fields are checked for any used entry in a step 102. If, in a step 104, there is a used entry, the used entry is marked as a replacement entry in a step 106. Again, the used entry may be one or more lines or a portion of one or more lines depending upon the size of the entry to be replaced. After step 100, further steps to be described in connection with FIG. 8 are implemented. If no used entry is found, the status fields for any single valid entry are checked in a step 108. Subsequent to step 108, the steps illustrated in FIG. 7 are implemented.

Illustrated in FIG. 7 is a continuation of the method of dynamic buffer entry replacement of FIG. 6. In a step 110, a determination is made whether any single valid entry is found. At least one single valid entry must be found. If multiple valid entries are found, then any one of the valid entries is sufficient for subsequent processing. If a single valid entry is found, a step 112 is implemented. The line(s) or a portion of a line of the valid entry that was found is marked as a replacement entry. After step 112, further steps to be described in connection with FIG. 8 are implemented. If no single valid entry is found, the status fields are checked for any busy hit entry in a step 114. A determination is made in a step 116 whether a busy hit entry is found. If, in step 116, there is a busy hit entry, the busy hit entry is marked as a replacement entry in a step 118. Again, the busy hit entry may be one or more lines or a portion of one or more lines depending upon the size of the entry to be replaced. After step 118, further steps to be described in connection with FIG. 8 are implemented. If no busy hit entry is found, the status fields for any busy fill entry are checked in a step 120. A determination is made in a step 122 whether any busy fill entry is found. If a busy fill entry is found, a step 124 is performed. The busy fill entry may be one or more lines or a portion of one or more lines depending upon the size of the entry to be replaced. After step 124, further steps to be described in connection with FIG. 8 are implemented. If no busy fill entry is found, the method is repeated by returning to step 96 and performing the method until a sufficient number of replacement entries are identified. Due to the dynamic nature of the filling, a resolution will ultimately occur in which a sufficient number of replacement entries are identified.

Illustrated in FIG. 8 are the steps 130, 132, 134, 136, 138 and 140 that are performed after a replacement entry is marked in steps 100, 106, 112, 118 and 124. The status field of the replacement entry is selectively updated based on the reconfiguration indicator. This updating reconfigures the prefetch buffer 30. The number of read requests to an addressed memory are determined based on the memory bus width in a step 132. The data size of one or more read requests are determined based on the data size and the status field information of the replacement entry. In a step 134 one or more read requests are generated to the addressed memory using the determined number and size of read requests. In a step 136, requested data is stored into a replacement entry of the prefetch buffer. In a step 138 the requested data is provided to the requesting master when part of the current request. If the requested data is not part of a current request (i.e. it is part of a prefetch only request), the data is stored in the identified replacement portion of the prefetch buffer 30.

It should be apparent that there has been provided a configurable prefetch buffer in a multiple processor data processing system for enhanced system performance. The prefetch buffer is dynamically configurable based on current read request attributes, such as data size and burst length. An adaptive prefetch buffer replacement method is used in order to minimize the miss rate and improve the power and performance characteristics of the system. The miss rate is reduced by efficient prefetching of future bus master requests. Power is reduced by minimizing unnecessary prefetching of read data from the memory resources of the system. It should be appreciated that there has been provided a memory controller that is efficiently organized in a dynamic manner to accommodate numerous system features and has data therein efficiently replaced to minimize power and enhance system performance.

The prefetch buffer replacement method is more efficient than conventional memory replacement algorithms. The consequences of the prefetch buffer replacement policy are that buffers are selected for filling on a 'least recently updated' basis when prefetching and on a 'most recently emptied' basis for demand fetches (i.e. a fetch which is actually satisfying a current bus master request). The prefetch buffer replacement policy allows for prefetched data to remain valid when non-prefetch enabled bus masters are granted memory access.

In the foregoing specification, the invention has been described with reference to specific embodiments. However, one of ordinary skill in the art appreciates that various modifications and changes can be made without departing from the scope of the present invention as set forth in the claims below. For example, other or additional read request attributes may be used to dynamically configure the prefetch buffer. The prefetch buffer method disclosed herein may be used on any system with any master or slave (memory) interface unit, whether on a microprocessor, microcontroller, DSP, or other digital circuitry. The prefetch buffer structure and method taught herein may be used in connection with any data processing architecture or processor family. Although a state machine may be used to dynamically configure and the select the state of the prefetch buffer, conventional combinatorial logic may implement the disclosed structures. Accordingly, the specification and figures are to be regarded in an illustrative rather than a restrictive sense, and all such modifications are intended to be included within the scope of the present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for configuring a prefetch buffer, comprising:
   receiving a read request from a master; and
   in response to the read request, selectively modifying total length of one or more prefetch buffer lines of the prefetch buffer based on an attribute of the read request to an adjusted line size, thereby eliminating dedication of buffer storage to unused portions of the one or more prefetch buffer lines, the prefetch buffer having lines of differing total length during operation.

2. The method of claim 1, wherein the attribute of the read request comprises one of a master identifier corresponding to the master, a data size of the read request, and a burst length of the read request.

3. The method of claim 2, wherein selectively modifying the total length of one or more prefetch buffer lines is based on a second attribute of the read request, wherein the second attribute comprises another one of the master identifier, the data size, and the burst length.

4. The method of claim 1, wherein the read request results in a miss in the prefetch buffer.

5. The method of claim 1, wherein the prefetch buffer includes a plurality of lines, each of the plurality of lines having a corresponding one of status fields.

6. The method of claim 5, further comprising:
   selecting at least a portion of the plurality of lines as a replacement entry within the prefetch buffer based on the status fields of the prefetch buffer.

7. The method of claim 6, wherein each of the status fields comprise an address tag field, an invalid field to indicate that a corresponding line in the prefetch buffer is not valid, a used field to indicate that a corresponding line in the prefetch buffer has been provided in response to a previous burst read request, and a valid field to indicate a corresponding line in the prefetch buffer has been provided in response to a previous non-burst read request.

8. The method of claim 6, wherein selectively modifying the total length of one or more prefetch buffer lines comprises selectively modifying a line size of the replacement entry.

9. The method of claim 8, wherein selectively modifying the line size of the replacement entry comprises selectively modifying a status field corresponding to the replacement entry.

10. The method of claim 9, wherein selectively modifying the status field corresponding to the replacement entry is based on the attribute of the read request, the attribute comprising at least one of a data size and a burst length of the read request.

11. The method of claim 10, further comprising:
   generating at least one data request to a memory addressed by the read request; and
   storing data from the memory into the replacement entry of the prefetch buffer.

12. A method for configuring a prefetch buffer, comprising:
   receiving a read request to a memory from a requesting master, the read request having a corresponding data size and burst length;
   providing a prefetch buffer reconfiguration indicator based on the data size and the burst length;
   selecting a replacement entry within the prefetch buffer;
   based on the prefetch buffer reconfiguration indicator, selectively modifying a total length of the replacement entry of the prefetch buffer based on an attribute of the read request to an adjusted line size that eliminates dedicating unused buffer storage to the replacement entry of the prefetch buffer; and
   storing data fetched from the memory in the replacement entry.

13. The method of claim 12, wherein the prefetch buffer reconfiguration indicator is based on the data size, the burst length, and a master identifier corresponding to the requesting master.

14. The method of claim 12, wherein selectively modifying the total length of the replacement entry comprises selectively modifying at least one status field corresponding to the replacement entry.

15. The method of claim 14, wherein the at least one status field comprises an address tag field, wherein selectively modifying the at least one status field comprises selectively modifying the address tag field.

16. The method of claim 12, wherein selecting the replacement entry within the prefetch buffer comprises checking at least one of valid, invalid, or used bits within status fields of the prefetch buffer.

17. The method of claim 12, further comprising:
generating at least one data fetch request to the memory, wherein the at least one data fetch request is based on a bus width corresponding to the memory.

18. A data processing system, comprising:
a master;
a memory;
a prefetch buffer, coupled to the master and the memory, the prefetch buffer having a plurality of lines and status fields, each of the plurality of lines having a corresponding one of the status fields, each of the status fields comprises an address tag field, an invalid field to indicate that a corresponding line in the prefetch buffer is not valid, a used field to indicate that a corresponding line in the prefetch buffer has been provided in response to a previous burst read request, and a valid field to indicate a corresponding line in the prefetch buffer has been provided in response to a previous non-burst read request; and
prefetch control circuitry coupled to the prefetch buffer, the prefetch control circuitry, in response to a read request from the master, selectively modifying a line size of at least a portion of the prefetch buffer.

19. The data processing system of claim 18, wherein the prefetch control circuitry selects a replacement entry within the prefetch buffer, and selectively modifying the line size comprises selectively modifying a line size of the replacement entry.

20. The data processing system of claim 19, wherein the prefetch control circuitry receives a data size indicator and a burst length indicator from the master and selectively modifies the line size of the replacement entry based on the data size indicator and the burst length indicator.

* * * * *